UNITED STATES PATENT OFFICE.

HAROLD S. BOOTH AND GEORGE G. MARSHALL, OF CLEVELAND, OHIO.

PROCESS OF RECOVERING AN ELEMENT CAPABLE OF FORMING A HALOID FROM ORES, MINERALS, &c., CONTAINING THE SAME.

1,392,043.  Specification of Letters Patent.  Patented Sept. 27, 1921.

No Drawing.   Application filed November 26, 1917.   Serial No. 204,002.

*To all whom it may concern:*

Be it known that we, HAROLD S. BOOTH and GEORGE G. MARSHALL, citizens of the United States, and residents, respectively, of Cleveland, in the county of Cuyahoga and State of Ohio, and Cleveland, in the county of Cuyahoga and State of Ohio, have invented a certain new and useful Improvement in Processes of Recovering an Element Capable of Forming a Haloid from Ores, Minerals, &c., Containing the Same, of which the following is a full, clear, and exact description.

This invention relates to a process by which an element occurring in chemical combination in an ore, mineral or other material, which element is capable of forming a volatile haloid, may be recovered.

The process disclosed is based on the fact that under proper conditions a volatile haloid of the element to be recovered, may be formed, which haloid may be recovered by being sublimed and subsequently handled to recover the desired element.

The process further contemplates that after the formation of a haloid of the element desired, during the reaction involved in the process, the haloid may under certain conditions be in part decomposed in the mass of material treated and remain in such mass of material, from which mass the desired element may be readily recovered in finished form.

The process is particularly useful when applied to the recovery of aluminium or similar elements, although the process in the various steps involved is not limited to the recovery of this element alone.

Furthermore the process is of importance particularly with reference to the treatment of certain ores, minerals, and materials containing potassium and other similar elements, in that, by the process, such elements may also be recovered.

The process will be disclosed in connection with the recovery of aluminium from an aluminium bearing ore, mineral, or other material, without in any way intending to limit the process thereby.

Aluminium occurs in nature in many forms, the most common forms perhaps being clay, bauxite, various feldspars and other combinations.

The process involved is applicable to all of the foregoing materials with which we are familiar.

In proceeding with the process, if the material usually occurring as a silicate, naturally does not contain sufficient silica ($SiO_2$), silica must be added, and in the event that the material to be treated contains more silica than that required in the chemical reaction involved in the process, sufficient flux should be added to take care of the excess of silica. Such fluxes as are commonly used are oxids or carbonates of the alkaline earth metals, or alkali metal oxids and carbonates, such as calcium oxid, calcium carbonate, magnesium oxid, magnesium carbonate, etc.

Furthermore, it is advisable to mix a small proportion of carbon in some form capable of conducting an electric current, such as coke.

To the material there is also added an alkali metal haloid, or a haloid of an alkaline earth metal, examples of which respectively, are sodium chlorid and calcium chlorid.

If, for instance, the mineral known as kaolinite be selected as the material to be treated, it is necessary to add to the kaolinite some silica, inasmuch as the material kaolinite is deficient in silica, for the purposes of the reaction of the process. There will also be added a haloid such as calcium chlorid, and a small amount of carbon. The materials employed should be made moisture free, or substantially so, by previous calcination. It is very desirable to have the materials free or substantially free from moisture as the presence of moisture will affect the amount of volatile chlorid formed. If moisture be present when the material is charged into the furnace, there will be a certain drying effect obtained as the material passes through the furnace before reaching the zone of reduction and to the extent that this may be effective to complete drying out the materials, aluminium chlorid will be formed when the material reaches the zone of reduction and will be volatilized, but if moisture be present in the form of steam at the zone of reduction, there will not be a complete volatilization of the aluminium present, as aluminium chlorid. The better practice therefore is to have the material anhydrous or substantially so. The mixture is heated in a suitable furnace, preferably an electric furnace, to a temperature at which reaction between the various elements involved proceeds, and the aluminium chlorid formed is volatilized. The temperature at which reaction proceeds to form a haloid of aluminium varies, and depends upon the condition of the materials used, but from experiments we have conducted, we have found the reaction temperature to be in the neighborhood of 1200 degrees centigrade.

The reaction involved in performing the process just outlined, is as follows:

$$Al_4(SiO_4)_3 + 6CaCl_2 + 3SiO_2 + (C) = 6CaSiO_3 + 4AlCl_3 + (C)$$

The aluminium chlorid thus formed, would at the temperature mentioned, be volatile, and provision is made in the furnace in which the process is conducted, for conducting the volatilized aluminium chlorid from the furnace to a suitable condensing apparatus in which the aluminium chlorid is deposited as a fine yellowish white powder.

The aluminium chlorid may subsequently be treated in a number of ways by which metallic aluminium may be recovered in its elemental state or other aluminium containing products formed.

If care be taken in the performance of the process, so that the entire mass of the material to be treated is caused to pass through the zone of the furnace in which the required temperature is maintained, the theoretical amount of aluminium chlorid may be recovered. If, however, for any reason, all the aluminium chlorid is not volatilized, the reaction will nevertheless have taken place, and portions of the aluminium chlorid may be found in the fused mass remaining in the furnace after the process is completed.

As appears from this reaction, this fused mass consists entirely or largely of calcium silicate and the added carbon. This silicate is easily disintegrated by running the same while still in fused condition into a body of cold water, in which event any aluminium chlorid present, will be dissolved and may be recovered. This is equally true of any other soluble salts which may be contained in the fused mass.

The foregoing reaction will take place in the same manner if sodium chlorid be used instead of calcium chlorid, and in fact, any alkali metal or alkaline earth metal haloid may be used with equal facility.

As before stated, the carbon is added primarily to increase the electrical conductivity of the mass. However, it may be utilized to assist in the reaction by virtue of its reducing power. Under such circumstances, the reaction in the decomposition of kaolinite would proceed in accordance with the following:

$$Al_4(SiO_4)_3 + 6CaCl_2 + 9C = 4AlCl_3 + 3CaSiO_3 + 3CaC_2 + 3CO$$

The carbids formed probably immediately undergo decomposition.

When it occurs that there is an excess of silica already contained in the material to be treated, as before stated, a basic flux may be added to take care of this excess. As an example of a reaction proceeding under these circumstances, the following example of the decomposition of a feldspar is given.

$$K_2O.Al_2O_3.6SiO_2 + 4CaCl_2 + 2CaO = 2KCl + 6CaSiO_3 + 2AlCl_3$$

In the example just given, the aluminium chlorid would volatilize and be recovered in the same manner as previously described.

In this last example given, potash occurs in the material treated, and it is seen that the potash would appear as a product of the reaction in the form of a chlorid. This chlorid would be contained in the mass of fused material remaining in the furnace after the aluminium chlorid was volatilized, although some of the KCl may be volatilized with the $AlCl_3$. The $AlCl_3$ may by further treated with steam which would hydrolyze it to insoluble alumina and HCl acid gas, and would leave the KCl recoverable by solution.

The fused mass which consists for the most part of calcium silicate and potassium chlorid, may while hot be run into a quantity of cold water which would cause disintegration of the mass and permit the potassium chlorid to go into solution from which it could be easily recovered.

In proceeding to treat the material it is advisable that such water as the materials may contain, be removed in a suitable manner before the process is performed.

In case that the contained water is not wholly removed, the volatile chlorid which is formed is in part volatilized and in part hydrolyzed during the reaction, and hydrochloric acid gas is evolved and passes from the furnace.

Hydrolyzed material, which is thus left in the fused mass, is easily soluble in dilute acids, and may be extracted from the fused mass by leaching with acidulated water or steam, or both.

It frequently happens that clays, bauxite, and in fact, many of the aluminium bearing ores and minerals contain some iron, and where this is the case, the iron, so far as the reaction of the process is concerned, behaves in the same manner as the aluminium, that is to say if a chlorid is the halogen used, forms an iron chlorid which is volatile if the temperature at which the reaction is caused to proceed is sufficiently high to recover the aluminium by the volatilization thereof.

Under such circumstances the aluminium chlorid and the iron chlorid would distil from the fused mass in mixed condition and pass from the furnace. However, inasmuch as the temperatures at which aluminium chlorid and iron chlorid condense are different, the former being at about 183° and the latter at about 280° C., it is possible to separate the aluminium chlorid from the iron chlorid by a process of fractional condensation, that is to say, the volatilized aluminium chlorid and iron chlorid may be caused to pass through a condenser which is maintained at a degree of heat which is below that at which the iron chlorid may remain volatile. Therefore the iron chlorid will be condensed. However, by maintaining the temperature above that at which aluminium chlorid will condense, the aluminium chlorid remains in its vapor form and passes on to a subsequent condenser which is at a proper temperature to permit the condensation of the aluminium chlorid.

In the operation of the process as described heretofore, the alkali metal haloid or alkaline earth metal haloid is broken up, freeing chlorin in its nascent form, at the same time the silicate is broken up and the silicate radical disengages itself from the element with which it is combined, so that the element is free to combine with the nascent chlorin.

It is very well known that the nascent form of any element is very much more active, chemically, than when in its molecular form, hence in this process the nascent chlorin, if the haloid used be a chlorid, is much more active than would be the case where chlorin gas from an outside source would be caused to pass to the material being fused, because, of course, chlorin gas when thus passed, would be in its molecular condition.

The foregoing fact is of material importance in the process and in the effectiveness with which the reactions take place as the process proceeds.

Furthermore, the use of a halogen salt makes the cost of recovering the desired element by the process, much cheaper than where gaseous chlorin is introduced, and attended with less difficulties due to escaping gas. With respect to calcium chlorid, it may be stated that calcium chlorid is formed as a by-product in certain processes, and up to the present time, no commercial use has been found which will take care of the large quantities of chlorid of calcium which is thus produced. This process may utilize, in part, at least, this calcium chlorid.

A typical reaction occurring in the performance of the process when applied to treatment of clays is herewith given, precaution first being taken to remove all the water contained in the material to be treated:

$$Al_2O_3.2SiO_2 + 3CaCl_2 + SiO_2 = 2AlCl_3 + 3CaSiO_3$$

In the case of bauxite, the following reaction would take place in the performance of the process, care being taken previously to remove the water from the material:

$$Al_2O_3 + 3CaCl_2 + 3SiO_2 = 3CaSiO_3 + 2AlCl_3$$

Examples of the reaction taking place as the process proceeds when potash feldspars are utilized as the source of material, have heretofore been given. Further reactions need not be given, although materials which may contain aluminium in connection with sodium, lithium, rubidium, cæsium, zinc, zirconium, etc., will respond to the process with equal facility. Examples of the reaction taking place as the process proceeds when certain minerals are utilized as a source of the material have heretofore been given.

Furthermore, other materials than those which contain aluminium, which materials may contain either singly or in various combinations the following elements, equally respond to the process to-wit: zinc, zirconium, titanium, tallium, uranium, vanadium, tin, bismuth, tungsten, tantalum, niobium, nickel, iron, chromium, cadmium, lead, beryllium, antimony, etc.

It will be clear from the reactions which have been given in connection with the performance of the process, that the quantities of halogen salt and silica, if such be necessary, or the quantity of flux, to be added to the ore or other material to be treated can readily be calculated in accordance with the reactions which have heretofore been stated.

Having described our invention, what we claim is:

1. The process which consists in mixing material containing aluminum with a chlorid which will react with the first mentioned material, having silica present in the mixture, heating the mixture to a temperature at which the reaction proceeds and chlorid of aluminum is formed, and sufficiently high to cause volatilization of the chlorid of aluminum, and collecting the volatilized chlorid.

2. The process which consists in mixing a haloid of an alkali metal or an alkaline earth metal with material containing aluminum, having silica present in the mixture, heating the mixture to a temperature at which reaction proceeds and the corresponding haloid of aluminum is formed, and sufficiently high to cause volatilization of the haloid of aluminum and collecting the volatilized haloid.

3. The process which consists in mixing a chlorid of an alkali metal or alkaline earth metal with material containing aluminum, having silica present in the mixture, heating the mixture to a temperature at which reaction proceeds and a chlorid of aluminum is formed, and sufficiently high to cause volatilization of the haloid of aluminum and collecting the volatilized haloid.

4. The process which consists in mixing material containing aluminum with a haloid capable of reacting with the said material, having silica present in the mixture, the aforesaid components of the mixture being in anhydrous condition, heating the mixture to a temperature at which reaction proceeds and a haloid of aluminum is formed, and sufficiently high to cause volatilization of the haloid of aluminum, and collecting the volatilized haloid.

5. The process which consists in mixing material containing aluminum with a chlorid capable of reacting with said material, having silica present in the mixture, the aforesaid components of the mixture being in anhydrous condition, heating the mixture to a temperature at which reaction proceeds and chlorid of aluminum is formed, and sufficiently high to cause volatilization of the haloid of aluminum, and collecting the volatilized haloid.

6. The process which consists in mixing a silicate containing aluminum with a haloid capable of reacting with the silicate, the aforesaid components of the mixture being in anhydrous condition, heating the mixture to a temperature at which reaction proceeds and a haloid of aluminum is formed, and sufficiently high to cause volatilization of the haloid of aluminum, and collecting the volatilized haloid.

7. The process which consists in mixing a silicate containing aluminum with a chlorid capable of reacting with the silicate, having the components of said mixture in anhydrous condition, heating the mixture to a temperature at which reaction proceeds and chlorid of aluminum is formed, and sufficiently high to cause volatilization of the aluminum chlorid, and collecting said chlorid.

8. The process which consists in mixing a haloid of an alkali metal or an alkaline earth metal with a silicate containing aluminum, having the components of the mixture in anhydrous condition, heating the mixture to a temperature at which reaction proceeds and a haloid of aluminum is formed, and sufficiently high to cause volatilization of the haloid of aluminum, and collecting the volatilized haloid.

9. The process which consists in mixing a haloid of an alkali metal or an alkaline earth metal, with material containing an element capable of forming a haloid, and also containing potassium, having silica present in the mixture, heating the mixture to a temperature at which reaction proceeds and sufficiently high to cause volatilization of the haloid of the aforesaid element which is formed by the reaction, collecting the volatilized haloid, treating the mass remaining after the haloid is volatilized with a suitable dissolving agent, whereby the potassium chlorid formed by the reaction is dissolved from the remaining fused mass.

10. The process which consists in mixing a haloid of an alkali metal or an alkaline earth metal, with material containing aluminium, having silica present in the mixture, having the materials of the mixture in anhydrous condition, heating the mixture to a temperature at which reaction proceeds and the haloid of aluminum is formed and sufficiently high to cause volatilization of the haloid of aluminium which is formed by the reaction and collecting the volatilized haloid.

11. The process which consists in mixing a chlorid of an alkali metal or an alkaline earth metal with material containing aluminium, having silica present in the mixture, having the before mentioned materials in anhydrous condition, heating the mixture to a temperature at which reaction proceeds and aluminum chlorid is formed and sufficiently high to cause volatilization of the aluminium chlorid which is formed by the reaction and collecting the volatilized aluminium chlorid.

12. The process which consists in mixing a chlorid of an alkali metal or an alkaline earth metal with a silicate containing aluminum, having the components of said mixture in anhydrous condition, heating the mixture to a temperature at which reaction proceeds and aluminum chlorid is formed, and sufficiently high to cause volatilization of the aluminum chlorid, and collecting the volatilized chlorid.

In testimony whereof we hereunto affix our signatures.

HAROLD S. BOOTH.
GEORGE G. MARSHALL.

Witness:
L. D. ROSKELLY.